Dec. 11, 1951
H. L. PEEK
2,578,204
DUMPING VALVE FOR EXPEDITING REVERSE
MOVEMENTS OF FLUID MOTORS
Filed May 14, 1948
3 Sheets-Sheet 1
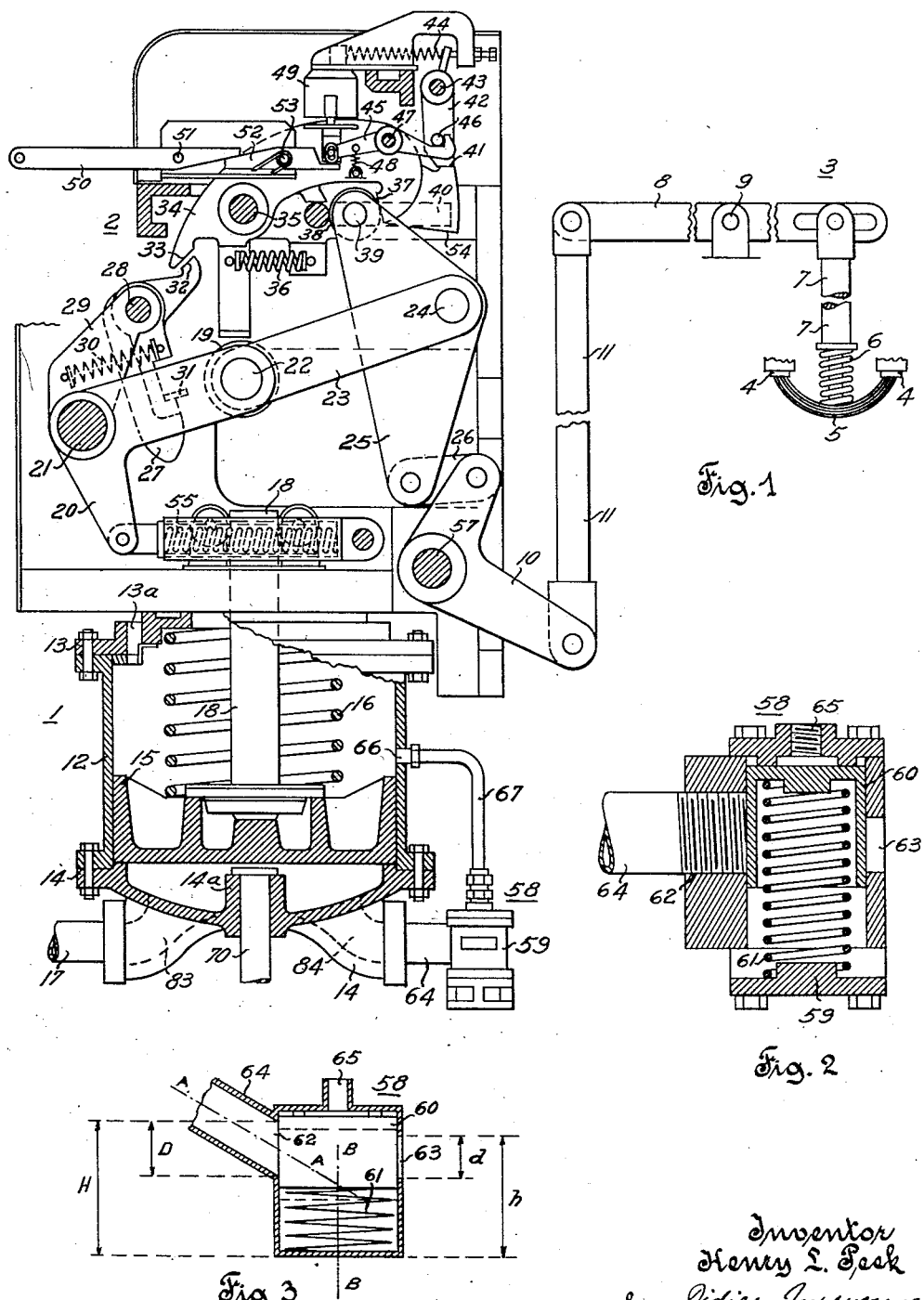

Dec. 11, 1951  H. L. PEEK  2,578,204
DUMPING VALVE FOR EXPEDITING REVERSE
MOVEMENTS OF FLUID MOTORS
Filed May 14, 1948  3 Sheets-Sheet 2

Inventor
Henry L. Peek
by Didier Journeaux
Attorney

Patented Dec. 11, 1951

2,578,204

UNITED STATES PATENT OFFICE 2,578,204

DUMPING VALVE FOR EXPEDITING REVERSE MOVEMENTS OF FLUID MOTORS

Henry L. Peek, Boston, Mass., assignor to Allis-Chalmers Manufacturing Company, Milwaukee, Wis., a corporation of Delaware Application May 14, 1948, Serial No. 26,964

9 Claims. (Cl. 200—82)

The invention relates to circuit breakers, and more particularly to pneumatically operated high speed circuit breakers.

An object of the invention is the provision of an improved pneumatic circuit breaker operating mechanism of the cylinder piston type capable of effecting high speed opening and reclosing of the circuit breaker.

Another object of the invention is to provide a pneumatic circuit breaker operating mechanism of the cylinder piston type comprising improved means for exhausting gas under pressure from the cylinder.

Circuit breakers for electrical power systems are required to operate at very high speed. This can be achieved by use of pneumatic operators of the cylinder piston type. Such operators require provision of dumping means for causing quick collapse of gas pressure in front of the piston tending to reduce the speed of the movement thereof. Effective dumping of compressed gas from the cylinder of a pneumatic operator of the cylinder piston type is of particular importance wherever it is desired to effect a rapid reversal of the movement of the piston. In case of reversal of the movement of the piston of a pneumatic motor supposed to operate at high speed, compressed gas should be dumped instantly from back of the piston preparatory to reversal of its movement.

In order to achieve dumping in a reliable uniform manner at each stroke of the piston requiring dumping, the point of time at which dumping is to be initiated must be predetermined with great accuracy, and dumping must rapidly thereafter be effected. Reliability of operation calls further for a self-sufficient circuit breaker operating system, i. e., one wherein the time at which dumping is initiated and during which it is effected is solely dependent upon operating conditions of, and within, the pneumatic operator rather than upon any extraneous conditions or means as, for instance, upon conditions of electric circuits, or upon the presence of electric relays. In addition to the foregoing reliability of operation requires that pressure conditions within the cylinder in the process of being vented be made the controlling factor as to maintaining the dumping means effective upon initiation thereof, and as to permitting the dumping means to become ineffective upon sufficient venting of the cylinder. It is, therefore, another object of the invention to provide a self-sufficient pneumatic circuit breaker operating mechanism of the cylinder piston type wherein the time at which dumping is initiated is determined by the relative position of the piston and the cylinder, and wherein the time during which the dumping means are maintained effective is determined by the pressure that the gas in the process of being dumped from the cylinder is capable to exert.

Different circuit breakers may have different mechanical systems having different masses, and may differ in many other respects, yet such different circuit breakers may lend themselves to operation by a standard pneumatic operator, provided that the operator permits rapid dumping of compressed gas from back of the piston at different but exactly predeterminable times before the piston has completed its potential stroke. In case of closing of a circuit breaker the piston of the pneumatic motor must be accelerated for a sufficient time to obtain the required speed of operation. Pressure of compressed gas upon the piston must also be maintained sufficiently long to achieve safe latching-in of the linkage provided for operatively relating the motor to the breaker and for restraining the breaker in closed circuit position. In order to permit rapid reversal of the movement of the piston gas pressure should not be maintained within the cylinder longer than necessary to meet these requirements. The point of time at which dumping is to be initiated is relatively critical and varies from circuit breaker to circuit breaker. It is, therefore, a further object of the invention to provide a standard pneumatic circuit breaker operating system in which can be applied to different circuit breakers and can readily be adjusted to the critical dumping time required for achieving best results in any particular application, and in which a self-adjustment of the time during which the dumping means are maintained effective in any particular application is achieved by controlling the dumping process by the pressure of the gas being dumped from the pneumatic motor.

Circuit breakers for electrical power systems comprise a linkage which is supposed to be latched-in when the piston is in closed circuit position so as to preclude the contacts of the circuit breaker to part. If a circuit breaker is being closed by a pneumatic operator and the latching means fail to restrain the linkage and the contacts in closed circuit position, the contacts, which are biased to an open circuit position, are allowed to part. In that particular case parting of the contacts may occur at a very slow speed on account of a decelerating or dashpot action of the pneumatic operator. Parting of the contacts at a small speed results in prolonged arcing. In the case under consideration, the arcing time may well be sufficiently long to endanger both the system into which the breaker is connected as well as the breaker itself. It is, therefore, another object of the invention to provide means which become operative as often as latching-in is to occur for precluding damage to the breaker as well as to the system into which the breaker is connected in case of a latch failure.

Another object of the invention is the provision of an improved circuit breaker operating mechanism that comprises a linkage of the trip free type for operating the breaker and latching means for latching the linkage to restrain the breaker in closed circuit position, and that further comprises a pneumatic motor of the cylinder piston type having means for returning the piston to its initial position instantly upon completion of each closing operation.

Another object of the invention is to provide an improved pneumatic operating mechanism for circuit breakers which lends itself to rapid reclosing duty, is simple, safe and reliable in operation, and inexpensive to manufacture.

Another object of the invention is to provide improved pneumatic circuit breaker operating mechanisms that can readily be made up by addition of some standardized elements to pneumatic circuit breaker operating mechanism of different kinds and/or sizes.

Another object of the invention is to improve the pneumatic circuit breaker mechanism disclosed in the copending application of Edwin C. Goodwin, Serial No. 27,076, filed May 14, 1948, and assigned to the same assignee as the present invention.

Other objects and advantages of the invention will become apparent from the following description when read in connection with the accompanying drawings, in which:

Fig. 1 is a view, partly in section, of a circuit breaker operating system embodying the present invention, the circuit breaker being shown somewhat diagrammatically;

Fig. 2 is a vertical cross section on a larger scale of the dump valve shown in Fig. 1;

Fig. 3 shows, diagrammatically, a modification of the dump valve of Fig. 2;

Figure 4:
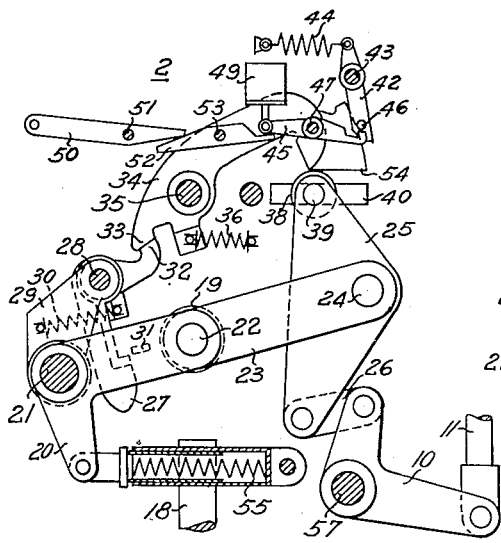
Fig. 4 shows the same linkage and latch system as shown in Fig. 1, however, shortly upon initiation of a tripping operation and prior to reaching by the parts which constitute that system of their respective open circuit positions.

Referring now to Fig. 1 of the drawings, reference character 1 indicates generally a pneumatic motor of the cylinder piston type for operating the circuit breaker. The latter has been generally indicated by reference character 3. Motor 1 and circuit breaker 3 are operatively related by a linkage of the trip-free type which has been generally indicated by reference character 2.

As diagrammatically shown, the circuit breaker 3 comprises a pair of stationary contact members 4 and a movable contact member 5. The circuit breaker is biased to open circuit position by means of accelerating spring 6. The movable contact member 5 is supported by a breaker rod 7 which, in turn, is supported by lever 8 pivoted at 9. Lever 8 is connected to bell crank lever 10 by means of operating rod 11. Bell crank lever 10 is pivoted at 57 and forms part of linkage 2.

Motor 1 comprises the main casting 12 defining the lateral wall of the operating cylinder of the motor, the top element 13 and the base element 14. Piston 15 of motor 1 is biased in a downward direction by a helical spring 16 of which one end rests against top element 13, while its other end rests against piston 15. Base element 14 defines a passage 83 which is connected to duct 17 for admitting gas under pressure from a suitable source (not shown) to the cylinder of motor 1. The flow of gas under pressure from said source to the cylinder of motor 1 may be controlled by a suitable valve (not shown), preferably a solenoid operated valve. Upon admission of gas under pressure to motor 1, piston 15 is moved in an upward direction against the bias of spring 16. Piston 15 is provided with a ram or plunger 18 adapted to cooperate with a roller 19 forming part of linkage 2. Upon raising of piston 15, the parts by which linkage 2 is constituted are moved to their position shown in Fig. 1, which causes engagement of contacts 4 and 5 of circuit breaker 3. Linkage 2 is now being latched-in by latching means which are fully described below, and thus linkage 2 restrains circuit breaker 3 in the closed position thereof against the bias of accelerating spring 6. When circuit breaker 3 is closed, piston 15 and ram 18 are free to move to their initial position shown in Fig. 1 under the combined action of gravity and spring 16.

There are certain instances where it is desired to close a circuit breaker manually without resorting to the operation of a pneumatic motor. To comply with that requirement, cylinder base 14 is provided with a bearing 14a adapted to receive plunger 70. Plunger 70 may be operated by means of a hand closing jack (not shown) to close circuit breaker 3.

Figure 5:
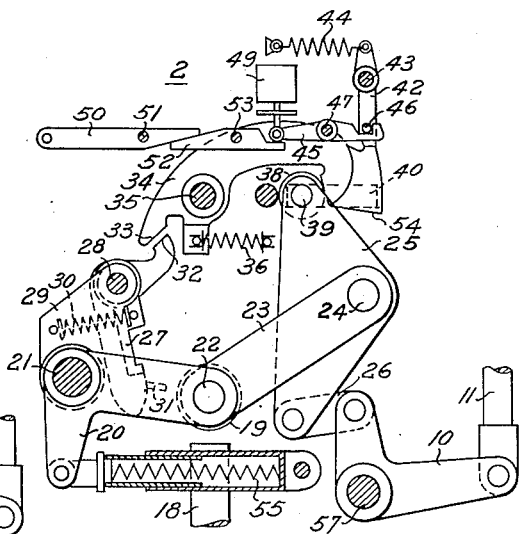
Fig. 5 shows the same structure as Fig. 4, however, in open circuit position.

Linkage 2 includes a bell crank lever 20 pivoted at 21 and connected by pin 22 to toggle link 23. Lever 20 and toggle link 23 form a toggle 20, 23 which is slightly off center in the closed position of the breaker (not shown in Fig. 1) and which may be caused to collapse (as indicated in Figs. 4 and 5). The center pin 22 of toggle 20, 23 supports the above referred to roller 19 adapted to be acted upon by the plunger or ram 18 on piston 15. The right end of link 23, as viewed in Fig. 1, is pivoted at 24 to a floating lever 25. Link 26 interconnects floating lever 25 and bell crank lever 10. The main latch 27 is pivotally supported at 28 by stationary bracket 29 and acted upon by compression spring 30 of which one end bears against the main latch 27, while the other end bears against bracket 29. The lower end of main latch 27 is adapted to engage a latch plate 31 forming an integral part of bell crank lever 20. The upper end of main latch 27 constitutes an abutment 32 adapted to be engaged by a cooperating abutment 33 on latch 34. Latch 34 is pivoted at 35 and acted upon by a compression spring 36 tending to pivot it in a clockwise direction about pin 35. As viewed in Fig. 1, the right side of latch 34 is provided with a cam surface 37 adapted to engage a roller 38 carried by floating lever 25 by means of pin 39. Upon release of roller 38 by cam surface 37, floating lever 25 is free to move under the action of accelerating spring 6, and this permits separation of contacts 4 and 5 of circuit breaker 3. When roller 38 has been released by cam surface 37, pin 39 moves from left to right along a substantially straight path defined by guiding means 40. Latch 34 is also provided with a straight cam surface 54 adapted to engage roller 38 during the interrupting process of the circuit breaker, as will more clearly be seen as the description progresses. An upper cam surface 41 on latch 34 rests against a latch 42 pivoted at 43 and acted upon by biasing spring 44 tending to pivot it in a counterclockwise direction about pin 43. Latch 42 is held in position by a latch 45 engaging pin 46 on latch 42. Latch 45 is pivoted at 47 and biased in a counterclockwise direction by spring 48. The left arm of latch 45 is adapted to be pulled in an upward direction by a solenoid or a similar electroresponsive means 49, thus causing latch 45 to pivot about pin 47 in a clockwise direction. Lever 50 is pivotally mounted on pin 51 and adapted to engage lever 52 which is pivotally mounted on pin 53. Lever 52 is spring biased in a clockwise direction. Upon pivoting of lever 50 in a clockwise direction about pin 51 (which may be effected manually), lever 52 is pivoted against the action of its biasing spring in a counterclockwise direction about pin 53 as shown in Fig. 4. This causes latch 45 to be pivoted in a clockwise direction about pin 47 releasing latch 42. Latch 42 then pivots about pin 43 in a counterclockwise direction which releases latch 34 and roller 38 on floating lever 25 which, in turn, initiates separation of contacts 4 and 5 under the action of accelerating spring 6.

The separation of contacts 4, 5 may be initiated and effected in a similar way by energizing the relay or solenoid 49 in response to the occurrence of a fault in the system into which the breaker is connected or in response to manual operation of an auxiliary switch.

A resetting compression spring 55 is arranged below the linkage and latch system 2 of the breaker and biases bell crank lever 20 in a clockwise direction. When the breaker is tripped, as indicated in Fig. 4, the linkage and latch system 2 will be reset by the action of spring 55, thus assuming the position shown in Fig. 5.

In order to close the breaker, compressed gas is admitted to fluid motor 1 through duct 17 and passage 82, thus causing piston 15 and ram 18 to move in an upward direction. The closing force of motor 1 is applied to linkage 2 by engagement of ram 18 and roller 19. Fig. 5 shows the linkage mechanism in open position. Toggle 20, 23, in moving up during a closing stroke of piston 15, rotates floating lever 25 about pin 39 as a center in a counterclockwise direction. That rotary motion of lever 25 causes the left side of link 26 to be moved to the right. This, in turn, causes bell crank lever 10 to rotate in a clockwise direction about pin 57 as a center, pulling connecting rod 11 down and breaker rod 7 up, thereby closing the breaker against the action of accelerating spring 6.

As mentioned above, tripping may be initiated either mechanically by lifting the left end of lever 50, or electrically by energizing trip solenoid 49. In both instances the ensuing sequence of operation is about the same. When trip solenoid 49 is energized the armature thereof lifts latch 45 against the bias of spring 48. The resulting clockwise rotation of latch 45 about pivot 47 releases pin 46 on latch 42. Thus latch 42 is free to rotate under the action of spring 44 in a counterclockwise direction, thereby sliding off the large latch 34. The large latch 34 is then free to rotate in a counterclockwise direction about pin 35 under the action of roller 38 which is acted upon by the powerful accelerating spring 6. The counterclockwise rotation of latch 34 against the bias of spring 36 permits the top end of floating lever 25 to move to the right. As pin 39 on lever 25 moves to the right it slides in guiding means 40. That movement of lever 25 and pin 39 permits parts 7, 8 and 11 of breaker 3 to move to open circuit position.

Rotation of latch 34 in a counterclockwise direction about pin 35 causes abutment 33 to engage abutment 32 on main latch 27, thereby rotating main latch 27 in a clockwise direction about pin 28. Thus main latch 27 becomes disengaged from latch plate 31 on bell crank lever 20, as indicated in Fig. 4.

Fig. 4 shows the position of the parts of the linkage and latch system 2 shortly upon initiation of the tripping process but before completion thereof. Fig. 5 shows the position of the parts of the linkage and latch system 2 upon completion of the tripping process. At the beginning of the tripping process, pin 39 moves in guiding means 40 from left to right. Upon release of latch plate 31 by main latch 27, resetting spring 55 causes a clockwise rotation of bell crank lever 20 about pin 21 which, in turn, causes collapse of toggle 20, 23, resulting in a movement of pin 39 in guiding means 40 from the right to the left, as shown in Fig. 5. While pin 39 moves from left to right, and then back to the left, the straight cam surface 54 of latch 34 rests against the top of roller 38. Upon return of pin 39 and roller 38 to their original left position, latch 34 drops in place under the action of compression spring 36. This allows the balance of system 2, including latches 42 and 45, to reset, as shown in Fig. 5. With the parts of the linkage and latch system 2 back in the position shown in Fig. 5, the operator is ready for the next closing operation.

Figure 6:
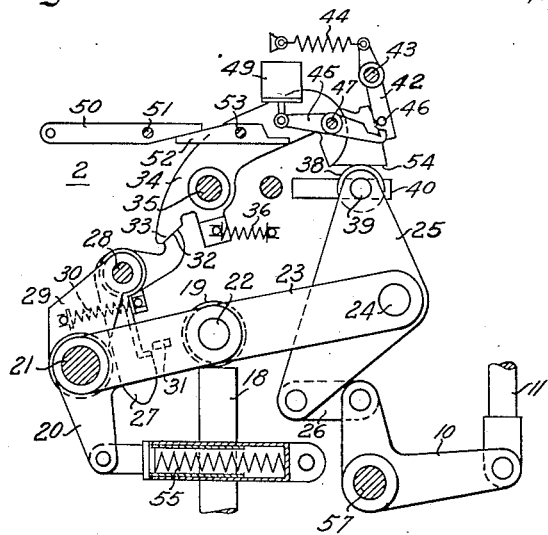
Fig. 6 shows the same structure as Fig. 5, in open circuit position following a trip-free operation.

It may occur that trip solenoid 49 is being energized while plunger 18 is still in its upper or closed position. Fig. 6 shows the position of the parts of linkage and latch mechanism 2 if caused to collapse by energizing trip solenoid 49 while pin 22 and roller 19 are held in their upper position by plunger 18.

A closing operation is completed when main latch 27 has engaged latch plate 31. Then the supply of compressed gas may automatically be shut off. This may be achieved, for instance, by a limit switch (not shown) controlled by shaft or pin 21. Assuming now that there is a main latch failure, i. e., that either the main latch 27 or the latch plate 31 are so badly damaged (either broken or worn out) that they fail to restrain the breaker in closed circuit position. The breaker will then reopen under the action of accelerating spring 6, but its opening movement might be relatively slow on account of the decelerating action, or dashpot action, of fluid motor 1. Even if the supply of compressed gas is shut off from motor 1 and the lower side of the motor 1 is being vented to atmosphere by prior art venting means, the decelerating effect of motor 1 might be too large and the speed of separation of the contacts 4, 5 too small to achieve a safe interruption of the circuit controlled by the breaker. The dumping means shown in Fig. 1 are, however, so effective as to preclude any danger in case of complete failure of latching means 27 and 31.

As shown in Fig. 1, dumping of gas under pressure previously admitted through passages 17 and 83 to cylinder 12 may be effected by a piston type valve which has been generally indicated by reference sign 58. Dump valve 58 comprises a cylindrical valve body 59 which is formed by a casting separate from the castings 12, 13, 14 constituting motor 1. As shown in Fig. 2, valve element 60 is movably arranged within valve body 59 and biased to a closed position by means of helical spring 61. Valve element 60 is in the shape of a piston and one end of spring 61 rests against the inner side thereof, while the other end of spring 61 rests upon the base of valve body 59. Valve body 59 is provided with an intake opening 62 and an exhaust opening 63. Dumping tube 64 interconnects the base 14 of motor 1 with intake opening 62 of valve 58. The top of valve body 59 is provided with a screw threaded opening 65. Cylinder 12 of motor 1 is provided with an orifice 66 which is uncovered toward the end of each closing stroke of piston 15 so as to permit passage of compressed gas previously admitted to motor 1 through passage 17. Permanently open duct 67 interconnects orifice 66 with pilot opening 65. Upon uncovering of orifice 66 by piston 15 compressed gas flowing through duct 67 depresses valve element 60 against the bias of spring 61. This effects initial opening of valve 58, permitting compressed gas from motor 1 to enter through intake opening 62 into the body 59 of valve 58, tending to push valve element 60 farther down to uncover exhaust port 63. Upon uncovering of port 63, gas under pressure below piston 15 is free to flow through passage 64, intake opening 62, the space within valve 58 above valve element 60 and exhaust opening 63 to atmosphere. When valve 58 has been wide opened by compressed gas admitted to it through passage 64, a high pressure zone forms on top of valve element 60 tending to maintain valve element 60 in its open position against the bias of spring 61. Thus valve element 60 remains safely in its open position when, as a consequence of the reversal of the movement of piston 15 under the action of spring 16, orifice 66 in cylinder 12 is reclosed or obstructed by piston 15 as it moves in a downward direction. In the position of valve 58 shown in Figs. 1 and 2, valve element 60 shuts off intake opening 62 from the inside of valve body 59 and, as long as this is the case, valve 58 cannot be opened by any pressure of gas in passage 64.

Cracking of valve 58 by compressed gas supplied through duct 67 and pilot port 65 to the top of valve element 60 will occur close to the end of each closing stroke of piston 15. There must be sufficient power behind piston 15 to insure engagement of main latch 27 and latch plate 31 before compressed gas can be dumped from fluid motor 1. The moment the breaker 3 is restrained in closed circuit position by engagement of latching means 27 and 31, any gas under pressure within the cylinder 12 of motor 1 can instantly completely be dumped. If the latch mechanism 27, 31 performs properly upon closing of circuit breaker 3 by fluid operated motor 1, the circuit breaker will remain in closed circuit position (unless it should be tripped at that time either manually or automatically) but dumping of gas under pressure through passage 64, intake port 62, valve 58 and exhaust port 63 will nevertheless occur and result in substantially instantaneous high speed reversal of the movement of piston 15 to its position shown in Fig. 1. Piston 15, upon having reached that position, is ready to perform another closing operation.

In order not to decelerate the closing stroke of piston 15 by formation of a cushion of compressed air in front of it, the top end of fluid motor 1 is permanently vented to atmosphere by provision of one or more venting holes 13a in cover casting 13.

It will readily be observed from the foregoing that initial opening of dumping valve 58 occurs irrespective of the condition of the circuit controlled by the breaker, and that dumping does not depend upon the proper operation of any electro-responsive trip device. Where the operation of a valve for dumping of compressed gas from the cylinder of a fluid operated circuit breaker operating motor is made dependent upon the operation of an electroresponsive trip device, the dump valve does not afford any protection against the harmful consequences of a latch failure. Such an operating mechanism for circuit breakers would call for the provision of additional means for guarding against the harmful consequences of a latch failure, e. g., provision of an additional dump valve which opens automatically when the supply of compressed gas is shut off from the breaker operating motor. It is apparent that the arrangement of the present invention requiring but one type of dump valve is more simple, more reliable in operation, and less expensive to manufacture.

The biasing action of spring 61 is extremely light. Therefore valve 58 will remain open as long as there is but a small amount of pressure in the lower portion of cylinder 12 in excess of atmospheric pressure.

The piston valve 58 diagrammatically shown in Fig. 3 comprises a valve body 59 having a lateral opening 62 for admission of gas under pressure to be dumped from the cylinder of a pneumatic motor and an axial pilot opening 65 for admission of gas under pressure to effect initial cracking of valve 58 against the bias of spring 61. The exhaust port 63 of valve body 59 has a smaller area $d$ than the area $D$ of the intake port 62. When valve 58 is closed, its piston-shaped valve element 60 closes both ports 62 and 63. Upon admission of compressed gas through pilot opening 65, valve element 60 will be depressed against the bias of spring 61 and assume a position shown in dotted lines wherein it permits compressed gas to enter through port 62 into valve body 59, but still blocks port 63 so as to preclude compressed gas to be exhausted through port 63. It will be observed that the intake port 62 and the outlet port 63 are out of registry, the height $h$ being less than the height $H$, and this is the reason why valve element 60 will assume a position wherein port 62 is partially opened while port 63 is still completely blocked by valve element 60.

The valve shown in Fig. 3 differs mainly from that shown in Fig. 2 by reason of the fact that the axis A—A of its passage 64 for admission of compressed gas under pressure from a pneumatic motor to be vented (not shown) and the longitudinal axis B—B of the valve body 59 and valve element 60 are in an acute angular relation. Consequently, the kinetic energy inherent in the flow of gas under pressure escaping through passage 64 will be used for moving valve element 60 to its fully open position upon being cracked by compressed gas admitted through pilot port 65, and when wide open, valve 58 will be maintained wide open by a component in the direction of axis B—B of the force of the flow in the direction of axis A—A.

The different level and size of ports 62 and 63 are more important in the structure of Fig. 2 than in that of Fig. 3, because in the latter structure the axial pressure component is generally sufficient to maintain the valve in an open position after it has once been cracked.

The same reference characters having been applied to like parts in all the figures, the structures shown in Figs. 7 to 9 will be described only inasmuch as they differ significantly from the structure of Figs. 1 and 2.

Figure 7:
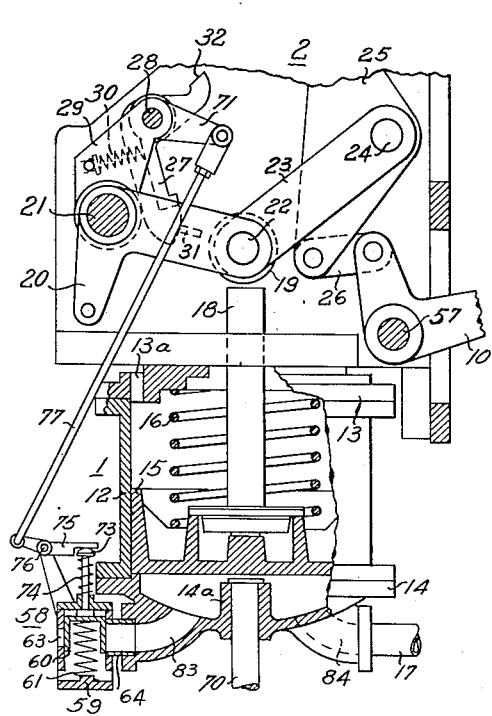
Figs. 7–9 are views, partly in side elevation and partly in section, of three modifications of the circuit breaker operating mechanism embodying the principles of the invention.
Figure 8:
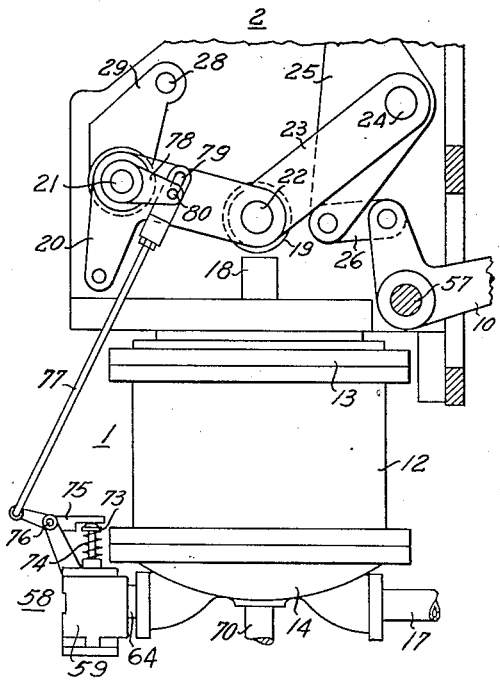
Figure 9:
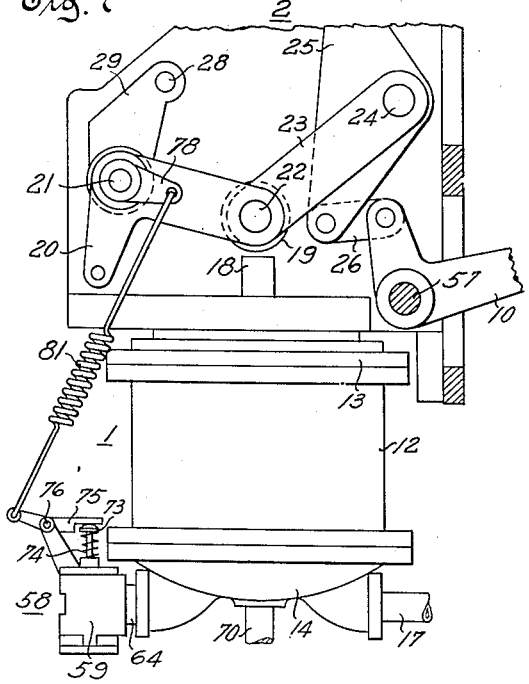

The structures shown in Figs. 7 to 9 do not differ from that of Fig. 1 as far as pneumatic motor 1 and linkage and latch system 2 are concerned. While Fig. 1 shows an embodiment of the invention involving pneumatic means for effecting initial opening or cracking of dump valve 58, Figs. 7 to 9 show structures involving plainly mechanical means for effecting that operation.

Referring now to Fig. 7, plunger 18 forming an integral part of piston 15 of pneumatic motor 1 acts upon operating toggle 20, 23. When toggle 20, 23 reaches its closed circuit position, it is latched in that position by engagement of main latch 27 and latch plate 31. Engagement of the latching means 27, 31 is effected by compression spring 30, tending to rotate main latch 27 in a counterclockwise direction about pin 28. Pin 28 carries a lever 71 adapted to be rotated simultaneously with main latch 27 for effecting initial opening or cracking of dump valve 58 substantially simultaneously with the engagement of latch plate 31 by main latch 27. Dump valve 58 comprises valve body 59, valve element 60, a first biasing spring 61 for biasing valve element 60 to a closed position, a plunger 73 separate from and adapted to actuate valve element 60 to effect initial opening of valve 58, a second biasing spring 74 for biasing plunger 73 in an upward direction, and a rocking lever 75 pivoted at 76 for actuating plunger 73 against the bias of spring 74. Levers 71 and 75 are interconnected by pull rod 77 which transmits the motion of the former to the latter.

In the arrangement shown in Fig. 7 initial opening or cracking of dump valve 58 occurs immediately after completion of the closing stroke of piston 15 of motor 1. Since latching occurs after completion of the closing stroke of piston 15, and initial opening of dump valve 58 occurs substantially simultaneously with latching, a time increment which depends upon the characteristic of latch spring 30 must be added to the closing time for determining the time of initial opening or cracking of dump valve 58.

Plunger 73 of dump valve 58 will be returned to its initial position at the time when latching means 27, 31 are caused to disengage. Such disengagement occurs on account of engagement of abutment 32 on main latch 27 by abutment 33 on latch 34 (Fig. 1) either during a normal tripping operation (Figs. 4 and 5) or during a tripfree operation (Fig. 6). Hence any tripping operation results in a return of plunger 73 to its initial position preparatory to a subsequent closing operation of the circuit breaker.

Referring now to Fig. 8, ram 18 is adapted to cooperate with roller 19 to lift toggle 20, 23 to the closed circuit position thereof. During the closing operation of linkage 2, bell crank lever 20 pivots in a counterclockwise direction about pin 21 by which it is supported. Lever 78 is likewise supported by pin 21 and, therefore, moves together with bell crank lever 20. Pull rod 77 for actuating rocking lever 75 of dump valve 58 is provided with a lost motion connection on the upper end thereof. That lost motion connection comprises means defining a slot 79 on pull rod 77 and a pin 80 on lever 78 engaging slot 79. During the closing operation of pneumatic motor 1, pin 80 moves in slot 79 without actuating either pull rod 77 or dump valve 58 until, at a predetermined point of the travel of the piston of motor 1, near to the end of the stroke thereof, pin 80 abuts against the upper end of slot 79 and thus pulls rod 77 up and effects initial opening or cracking of dump valve 58.

In Fig. 9 a pull spring 81 has been substituted for pull rod 77 and lost motion connection 79, 80, but aside from this the arrangements shown in Figs. 8 and 9 are the same. Spring 81 is increasingly tensioned as the closing stroke of fluid motor 1 progresses and bell crank lever 20, pin 21 and lever 78 are rotated in a counterclockwise direction. When spring 81 is sufficiently loaded, i. e., stressed to a predetermined point, it is able to effect initial opening or cracking of dump valve 58 by instantly pulling up the left end of rocking lever 75 of dump valve 58.

It will be observed that a common feature of the arrangements shown in Figs. 7 and 9 consists in that both rely for initial opening or cracking of the dump valve 58 on resilient means which are controlled by the piston of pneumatic motor 1. In an arangement as that shown in Fig. 8 where initial opening or cracking of dump valve 58 is effected by positive mechanical means which are directly operated by pneumatic motor 1, initial opening of the dump valve 58 occurs at a point of time before the piston of the motor completes its stroke and is arrested. The arrangements of Figs. 7 and 9 are intended, on the other hand, to effect initial opening of dump valve 58 immediately after completion of the closing stroke of motor 1.

Spring 81 of the structure shown in Fig. 9 can be so adjusted that it effects opening of dump valve 58 at any point of time during a closing stroke of pneumatic motor 1.

In all figures the ports for admitting compressed gas to the pneumatic motor and for dumping compressed gas from the pneumatic motor 1 are arranged at points which are never obstructed by the piston of the pneumatic motor. Consequently, both admission of gas under pressure to the motor 1 and dumping of gas under pressure from the motor 1 may be effected at any point of time irrespective of the position of the piston at that particular point of time. As shown in Figs. 1 and 7, the casting forming the base element 14 of the cylinder of fluid motor 1 defines two passages 83 and 84 the outer open ends of which serve for admitting compressed gas to motor 1, and exhausting compressed gas from motor 1, are situated on the same level. While passages 83 and 84 may be arranged in many different ways, the particular symmetrical arrangement thereof shown in the drawings is both simple and efficient.

Since dump valve 59 is mainly constituted by a casting separate from and connected to fluid motor 1, it is readily possible to use the same dump valve structure as a standard element for dumping compressed gas from fluid motors of various types and/or sizes. Such a standard dump valve can either be controlled pneumatically to effect initial opening thereof, as shown in Figs. 1 and 2, or by a linkage or similar mechanical means as shown in Figs. 7 to 9.

Having described several embodiments of the invention, it is to be understood that various changes and modifications may be made in any of the particular embodiments disclosed without departing from some of the essential features of the invention.

It is claimed and desired to secure by Letters Patent:

1. In an operating mechanism for circuit breakers, a motor operable by gas under pressure and comprising a cylinder and a piston movably arranged therein; a source of gas under pressure; means for admitting gas under pressure from said source to said cylinder to close the breaker; spring means for returning said piston to the initial position thereof upon closing of the breaker; a collapsible linkage of the trip free type for operatively relating the breaker to said motor; tripping means for causing collapse of said linkage to permit opening of the breaker; a ram on said piston separate from said linkage and cooperating therewith upon collapse thereof for reclosing the breaker; means for venting said cylinder to permit said spring means to rapidly return said piston to said initial position thereof, said venting means including a piston type valve, resilient means for biasing said valve to a closed position, and means defining a passage to atmosphere forming an integral part of said valve for maintaining said valve in an open position by the action of gas under pressure being vented through said passage, said last referred to means being adapted to be operative only upon cracking of said valve by separate means; and pilot means for cracking said valve including means defining an orifice in said cylinder controlled by said piston and means defining a permanently open duct for connecting said orifice to said valve.

2. In an operating mechanism for circuit breakers, a motor operable by gas under pressure and comprising a cylinder and a piston movably arranged therein; a source of gas under pressure; means for admitting gas under pressure from said source to said cylinder to close the breaker; spring means for returning said piston to the initial position thereof upon closing of the breaker; a collapsible linkage of the trip free type for operatively relating the breaker to said motor; tripping means for causing collapse of said linkage to permit opening of the breaker; a ram on said piston separate from said linkage and cooperating therewith upon collapse thereof for reclosing the breaker; means for venting said cylinder to permit said spring means to rapidly return said piston to said initial position thereof, said venting means including a piston type valve, resilient means for biasing said valve to a closed position, and means defining a passage to atmosphere forming an integral part of said valve for maintaining said valve in an open position by the action of gas under pressure being vented through said passage, said last referred to means being adapted to be operative only upon cracking of said valve by separate means; and pilot means for cracking said valve, said pilot means including a permanently open duct interconnecting said cylinder and said valve, and means defining an orifice in said cylinder for admitting gas under pressure to said duct, said orifice being arranged to be controlled by said piston to permit gas under pressure previously supplied from said source to said cylinder to be supplied from said cylinder to said valve only upon a predetermined travel of said piston in breaker closing direction.

3. In an operating mechanism for circuit breakers, a motor operable by gas under pressure and comprising a cylinder and a piston movably arranged therein; a source of gas under pressure; means for admitting gas under pressure from said source to said cylinder to close the breaker; a dump valve of the piston type for rapidly venting said cylinder, said valve comprising a valve body, a valve element movably arranged in said valve body, resilient means for biasing said valve element toward one end of said valve body, means defining a first lateral port in said valve body normally closed by said valve element under the bias of said resilient means and adapted upon opening thereof to admit gas under pressure from said cylinder into said valve body, means defining a second lateral port in said valve body for exhausting gas under pressure from said valve body to atmosphere, said second port being arranged more remotely from said one end of said valve body than said first port to effect sequential opening of said first port and said second port upon moving of said valve element against the bias of said resilient means; and pilot means under the control of said piston for moving said valve element against the bias of said resilient means for opening said first port to admit gas under pressure from said cylinder through said first port into said valve body.

4. In an operating mechanism for circuit breakers, a motor operable by gas under pressure and comprising a cylinder and a piston movably arranged therein; a source of gas under pressure; means for admitting gas under pressure from said source to said cylinder to close the breaker; a dump valve of the piston type for rapidly venting said cylinder, said valve comprising a valve body, a valve element movably arranged in said valve body, resilient means for biasing said valve element toward one end of said valve body, means defining a first lateral port in said valve body normally closed by said valve element under the bias of said resilient means and adapted upon opening thereof to admit gas under pressure from said cylinder into said valve body, means defining a second lateral port in said valve body for exhausting gas under pressure form said valve body to atmosphere, said second port being arranged more remotely from said one end of said valve body than said first port to permit at a predetermined position of said valve element admission of gas under pressure from said cylinder to said valve body without permitting exhaust of gas under pressure from said valve body to atmosphere; and pilot means for moving said valve element against the bias of said resilient means to open said first port to admit gas under pressure from said cylinder through said first port to said valve body prior to opening of said second port.

5. In an operating mechanism for circuit breakers, a motor operable by gas under pressure and comprising a cylinder and a piston movably arranged therein; a source of gas under pressure; means for admitting gas under pressure from said source to said cylinder to move said piston to a closed position; a spring means for returning said piston to the initial position thereof; a collapsible linkage of the trip free type for operatively relating said motor to the breaker and restraining the breaker in a closed position; a dump valve of the piston type for rapidly venting said cylinder, said valve comprising a valve body, a valve element movably arranged in said valve body and biased to a closed position, means defining a first lateral port in said valve body normally closed by said valve element and adapted upon opening thereof to admit gas under pressure from said cylinder into said valve body, and means defining a second lateral port in said valve body for exhausting gas under pressure from said valve body to atmosphere; and pilot means for effecting cracking of said valve preparatory to each return of said piston to the initial position thereof by said spring means, said pilot means including mechanical means operated by said linkage for moving said valve element sufficiently in a direction longitudinally thereof to cause at least partial opening of said first port.

6. In an operating mechanism for circuit breakers, a motor operable by gas under pressure and comprising a cylinder and a piston movably arranged therein; a source of gas under pressure; means for admitting gas under pressure from said source to said cylinder to move said piston to a closed position; a first spring means for returning said piston to the initial position thereof; a linkage of the trip free type including a collapsible operating toggle for operatively relating said motor to the breaker; latching means for restraining said toggle in a noncollapsed position; a second spring means for maintaining said latching means in an engaged position; tripping means for causing disengagement of said latching means; a dump valve of the piston type for rapidly venting said cylinder, said valve comprising a valve body, a valve element movably arranged in said valve body and biased to a closed position, means defining a first lateral port in said valve body normally closed by said valve element and adapted upon opening thereof to admit gas under pressure from said cylinder into said valve body, and means defining a second lateral port in said valve body for exhausting gas under pressure from said valve body to atmosphere; and pilot means for effecting cracking of said valve preparatory to each return of said piston to the initial position thereof by said spring means, said pilot means including mechanical means operated by said latching means for moving said valve element sufficiently in a direction longitudinally thereof to cause at least partial opening of said first port.

7. In an operating mechanism for circuit breakers, a motor operable by gas under pressure and comprising a cylinder and a piston movably arranged therein; a source of gas under pressure; means for admitting gas under pressure from said source to said cylinder to move said piston to a closed position; a spring means for returning said piston to the initial position thereof; a collapsible linkage of the trip free type for operatively relating said motor to the breaker and restraining the breaker in a closed position; a plunger operated by said piston for operating said linkage to close the breaker, said plunger being adapted to permit return thereof and of said piston to the initial position thereof irrespective of the position of said linkage; a dump valve of the piston type for rapidly venting said cylinder, said valve comprising a valve body, a valve element movably arranged in said valve body and biased to a closed position, means defining a first lateral port in said valve body normally closed by said valve element and adapted upon opening thereof to admit gas under pressure from said cylinder into said valve body, and means defining a second lateral port in said valve body for exhausting gas under pressure from said valve body to atmosphere; and mechanical means under the control of said linkage operative preparatory to each reversal of the movement of said piston for moving said valve element sufficiently in a direction longitudinally thereof to cause at least partial opening of said first port.

8. In an operating mechanism for circuit breakers, a motor operable by gas under pressure and comprising a cylinder and a piston movably arranged therein; a source of gas under pressure; means for admitting gas under pressure from said source to said cylinder to move said piston to a closed position; resilient means for biasing said piston to the initial position thereof; a linkage of the trip free type including a collapsible operating toggle for operatively relating said motor to the breaker; latching means for restraining said toggle in a noncollapsed position including a first latch element forming an integral part of said toggle, a second latch element adapted to engage said first latch element, and spring means for biasing said second latch element to engage said first latch element; means for causing disengagement of said latch elements; a plunger operated by said piston for operating said linkage to close the breaker, said plunger being adapted to permit reversal of the movement thereof and of said piston irrespective of the position of said linkage; a dump valve of the piston type for rapidly venting said cylinder, said valve comprising a valve body, a valve element movably arranged in said valve body and biased to a closed position, means defining a first lateral port in said valve body normally closed by said valve element and adapted upon opening thereof to admit gas under pressure from said cylinder into said valve body, and means defining a second lateral port in said valve body for exhausting gas under pressure from said valve body to atmosphere; and mechanical means operated by said spring means simultaneously with said second latch element for moving said valve element sufficiently in a direction longitudinally thereof to cause at least partial opening of said first port.

9. In an operating mechanism for circuit breakers, a motor operable by gas under pressure and comprising a cylinder and a piston movably arranged therein; a source of gas under pressure; means for admitting gas under pressure from said source to said cylinder to close the breaker; a dump valve of the piston type for rapidly venting said cylinder, said valve comprising a valve body, a valve element movably arranged in said valve body, resilient means for biasing said valve element toward one end of said valve body, means defining a first lateral passage forming an integral part of said valve for connecting said cylinder to said valve body and said valve element, said first passage being arranged in acute angular relation with respect to said valve body and said valve element whereby the kinetic energy of said gas passing therethrough assists the static pressure thereof to maintain said valve element in its open position, said first passage being adapted to be normally closed by said valve element under the action of said resilient means, and means on said valve body defining a second lateral passage for exhausting gas under pressure from said valve body to atmosphere; and pilot means for moving said valve element against the bias of said resilient means to open said first passage to admit gas under pressure from said cylinder through said first passage to said valve body to cause opening of said second passage.

HENRY L. PEEK.

REFERENCES CITED

The following references are of record in the file of this patent:

UNITED STATES PATENTS

| Number | Name | Date |
|---|---|---|
| 728,651 | Albright | May 19, 1903 |
| 2,048,550 | Helenberg | July 21, 1936 |
| 2,159,879 | Dewandre | May 23, 1939 |
| 2,286,023 | Strang | June 9, 1942 |
| 2,378,270 | Westervelt | June 12, 1945 |
| 2,389,621 | Grise | Nov. 27, 1945 |
| 2,408,199 | Cumming et al. | Sept. 24, 1946 |
| 2,422,562 | Peek | June 17, 1947 |

FOREIGN PATENTS

| Number | Country | Date |
|---|---|---|
| 647,572 | Germany | July 7, 1937 |